United States Patent
Ollila et al.

(10) Patent No.: US 12,056,856 B2
(45) Date of Patent: Aug. 6, 2024

(54) EXTENDED DEPTH-OF-FIELD CORRECTION USING RECONSTRUCTED IMAGE

(71) Applicant: Varjo Technologies Oy, Helsinki (FI)

(72) Inventors: Mikko Ollila, Tampere (FI); Mikko Strandborg, Hangonkylä (FI)

(73) Assignee: Varjo Technologies Oy, Helsinki (FI)

( * ) Notice: Subject to any disclaimer, the term of this patent is extended or adjusted under 35 U.S.C. 154(b) by 51 days.

(21) Appl. No.: 17/991,594

(22) Filed: Nov. 21, 2022

(65) Prior Publication Data

US 2024/0169496 A1 May 23, 2024

(51) Int. Cl.
| | | |
|---|---|---|
| G06T 5/73 | (2024.01) | |
| G06F 3/01 | (2006.01) | |
| G06T 5/20 | (2006.01) | |
| G06T 7/11 | (2017.01) | |
| G06T 7/50 | (2017.01) | |
| G06T 15/20 | (2011.01) | |
| G06T 17/00 | (2006.01) | |

(52) U.S. Cl.
CPC ............. *G06T 5/73* (2024.01); *G06F 3/013* (2013.01); *G06T 5/20* (2013.01); *G06T 7/11* (2017.01); *G06T 7/50* (2017.01); *G06T 15/20* (2013.01); *G06T 17/00* (2013.01)

(58) Field of Classification Search
CPC ..................................... G06T 5/73; G06T 7/50
See application file for complete search history.

(56) References Cited

U.S. PATENT DOCUMENTS

| | | | | |
|---|---|---|---|---|
| 2009/0185358 | A1* | 7/2009 | Liu | G03B 15/02 362/3 |
| 2014/0293016 | A1* | 10/2014 | Benhimane | G06T 7/246 348/50 |
| 2015/0235068 | A1* | 8/2015 | Gillet | G02B 27/0075 235/462.11 |
| 2017/0061587 | A1* | 3/2017 | Maeda | H04N 25/615 |
| 2018/0143419 | A1* | 5/2018 | Bryll | G02F 1/113 |

OTHER PUBLICATIONS

Tan et al, "EDoF-ToF: extended depth of field time-of-flight imaging", Optics Express, vol. 29, No. 23, https://doi.org/10.1364/OE.441515, Nov. 8, 2021, 17 pages.

* cited by examiner

*Primary Examiner* — Yi Yang
(74) *Attorney, Agent, or Firm* — Ziegler IP Law Group LLC.

(57) ABSTRACT

A method includes obtaining 3D model of real-world environment; receiving image captured using camera, and pose information indicative of camera pose from which image is captured; utilising 3D model to generate reconstructed image from a perspective of camera pose; identifying group(s) of neighbouring pixels in image that is/are out of focus; determining point spread function for group(s) of neighbouring pixels, based on correlation between group(s) of neighbouring pixels and corresponding group of neighbouring pixels in reconstructed image; and applying extended depth-of-field correction to group(s) of neighbouring pixels in image, by using point spread function.

11 Claims, 2 Drawing Sheets

EXTENDED DEPTH-OF-FIELD CORRECTION USING RECONSTRUCTED IMAGE

TECHNICAL FIELD

The present disclosure relates to computer-implemented methods for incorporating extended depth-of-field (EDOF) correction using reconstructed images. The present disclosure also relates to systems for incorporating EDOF correction using reconstructed images. The present disclosure further relates to computer program products for incorporating EDOF correction using reconstructed images.

BACKGROUND

Nowadays, with increase in number of images being captured every day, there is an increased demand for image processing, specifically for image enhancement. Such a demand may, for example, be quite high and critical in case of evolving technologies such as immersive extended-reality (XR) technologies, which are being employed in various fields such as entertainment, real estate, training, medical imaging operations, simulators, navigation, and the like. Such immersive XR technologies create XR environments for presentation to users of XR devices (such as XR headsets, pairs of XR glasses, or similar). Generally, the image processing is used to perform certain operations on the images captured by a camera to ensure that the images convey useful and rich visual information throughout their fields of view.

Despite progress in cameras used for image capturing, existing techniques and equipment for image generation have several limitations associated therewith. Firstly, cameras that are used for image capturing typically suffer from depth-of-field issues. Such depth-of-field issues can be resolved to some extent by adjusting a size of an aperture of a given camera. However, when the size of the aperture of the given camera is significantly smaller, images of a real-world environment in a low-light setting are not captured properly by the given camera. Moreover, when the size of the aperture of the given camera is significantly larger, images of the real-world environment are sharply captured only within a short focussing distance range of the given camera, and are captured blurred outside this focussing distance range. Furthermore, even when an auto-focus camera is employed for capturing the images, it is still not possible to capture sharp (i.e., in-focus) images in an entire field of view, because the auto-focus camera can be adjusted according to only one focussing distance range at a time. Therefore, the generated images are of low quality and unrealistic, and are often generated with considerable latency/delay. Secondly, some existing techniques and equipment exclusively rely on depth cameras for capturing depth information of the real-world environment in order to correct images (for example, having defocus blur). However, such depth information is generally unreliable and inaccurate because of similar depth-of-field issues in the depth cameras. Thus, image correction (such as image deblurring) lacks a required resolution, which is necessary for high-fidelity image generation, as it is not always possible to employ depth cameras, for example, in interest of minimizing an overall cost, power consumption, fault susceptibilities, and the like.

Therefore, in light of the foregoing discussion, there exists a need to overcome the aforementioned drawbacks associated with existing equipment and techniques for image generation.

SUMMARY

The present disclosure seeks to provide a computer-implemented method for incorporating extended depth-of-field correction using reconstructed image. The present disclosure also seeks to provide a system for incorporating extended depth-of-field correction using reconstructed image. The present disclosure further seeks to provide a computer program product for incorporating extended depth-of-field correction using reconstructed image. An aim of the present disclosure is to provide a solution that overcomes at least partially the problems encountered in prior art.

In a first aspect, an embodiment of the present disclosure provides a computer-implemented method comprising:
  obtaining a three-dimensional (3D) model of a real-world environment;
  receiving a given image of the real-world environment captured using a given camera, and pose information indicative of a given camera pose from which the given image is captured;
  utilising the 3D model of the real-world environment to generate a reconstructed image from a perspective of the given camera pose;
  identifying at least one group of neighbouring pixels in the given image that is out of focus;
  determining a point spread function for the at least one group of neighbouring pixels in the given image, based on a correlation between the at least one group of neighbouring pixels and a corresponding group of neighbouring pixels in the reconstructed image; and
  applying an extended depth-of-field correction to the at least one group of neighbouring pixels in the given image, by using the point spread function determined for the at least one group of neighbouring pixels.

In a second aspect, an embodiment of the present disclosure provides a system comprising at least one server configured to:
  obtain a three-dimensional (3D) model of a real-world environment;
  receive a given image of the real-world environment captured using a given camera, and pose information indicative of a given camera pose from which the given image is captured;
  utilise the 3D model of the real-world environment to generate a reconstructed image from a perspective of the given camera pose;
  identify at least one group of neighbouring pixels in the given image that is out of focus;
  determine a point spread function for the at least one group of neighbouring pixels in the given image, based on a correlation between the at least one group of neighbouring pixels and a corresponding group of neighbouring pixels in the reconstructed image; and
  apply an extended depth-of-field correction to the at least one group of neighbouring pixels in the given image, by using the point spread function determined for the at least one group of neighbouring pixels.

In a third aspect, an embodiment of the present disclosure provides a computer program product comprising a non-transitory machine-readable data storage medium having stored thereon program instructions that, when executed by a processor, cause the processor to execute steps of the computer-implemented method of the first aspect.

Embodiments of the present disclosure substantially eliminate or at least partially address the aforementioned problems in the prior art, and facilitate a simple, fast, accurate, and improved image deblurring by way of using reconstructed image, thereby generating images having high realism and high visual fidelity, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
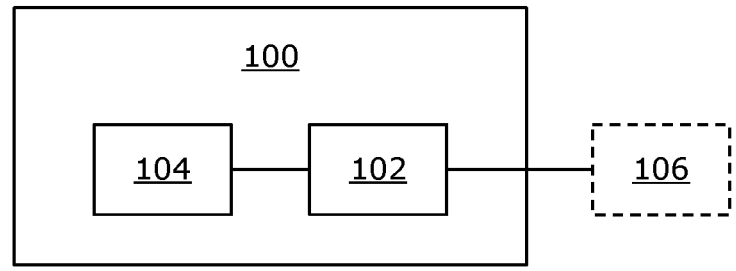
FIG. 1 illustrates a block diagram of a system for incorporating extended depth-of-field correction using reconstructed image, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computer-implemented method comprising:
   obtaining a three-dimensional (3D) model of a real-world environment;
   receiving a given image of the real-world environment captured using a given camera, and pose information indicative of a given camera pose from which the given image is captured;
   utilising the 3D model of the real-world environment to generate a reconstructed image from a perspective of the given camera pose;
   identifying at least one group of neighbouring pixels in the given image that is out of focus;
   determining a point spread function for the at least one group of neighbouring pixels in the given image, based on a correlation between the at least one group of neighbouring pixels and a corresponding group of neighbouring pixels in the reconstructed image; and
   applying an extended depth-of-field correction to the at least one group of neighbouring pixels in the given image, by using the point spread function determined for the at least one group of neighbouring pixels.

In a second aspect, an embodiment of the present disclosure provides a system comprising at least one server configured to:
   obtain a three-dimensional (3D) model of a real-world environment;
   receive a given image of the real-world environment captured using a given camera, and pose information indicative of a given camera pose from which the given image is captured;
   utilise the 3D model of the real-world environment to generate a reconstructed image from a perspective of the given camera pose;
   identify at least one group of neighbouring pixels in the given image that is out of focus;
   determine a point spread function for the at least one group of neighbouring pixels in the given image, based on a correlation between the at least one group of neighbouring pixels and a corresponding group of neighbouring pixels in the reconstructed image; and
   apply an extended depth-of-field correction to the at least one group of neighbouring pixels in the given image, by using the point spread function determined for the at least one group of neighbouring pixels.

In a third aspect, an embodiment of the present disclosure provides a computer program product comprising a non-transitory machine-readable data storage medium having stored thereon program instructions that, when executed by a processor, cause the processor to execute steps of the computer-implemented method of the first aspect.

The present disclosure provides the aforementioned method, the aforementioned system, and the aforementioned computer program product for facilitating a simple, fast, accurate, and improved image deblurring by way of using reconstructed image, thereby generating images having high realism and high visual fidelity. Herein, instead of comparing individual pixels in the given image with corresponding pixels in the reconstructed image, only out-of-focus group(s) of neighbouring pixels in the given image are compared with corresponding group(s) of neighbouring pixels in the reconstructed image (that is in-focus throughout its field of view) for determining the point spread function (PSF) for the out-of-focus group(s). Then, the PSF is used for applying the extended depth-of-field (EDOF) correction to the out-of-focus group(s) of neighbouring pixels in the given image. Moreover, the determination of the PSF is not dependent on optical depths of the pixels. As a result, high-quality and accurate images are generated in real time or near-real time even when both visible-light cameras as well as depth cameras suffer from depth-of-field issues.

In this way, the method and the system do not necessarily require depth cameras for sensing optical depths of objects, and conveniently rely on the reconstructed image (generated from the 3D model) for generating acceptably accurate deblurred images. EDOF-corrected images are accurate and realistic, for example, in terms of representing objects or their parts. This potentially leads to a realistic, immersive viewing experience for a user, when said images are displayed to the user. The method and the system are simple, robust, fast, reliable, support real-time high-quality image deblurring and can be implemented with ease.

Notably, the at least one server controls an overall operation of the system. In some implementations, the at least one server is implemented as a remote server. In an example, the remote server could be a cloud server that provides a cloud computing service. In other implementations, the at least one server is implemented as a processor of a device comprising at least the given camera, or as a processor of a computing device communicably coupled to said device. Examples of the device include, but are not limited to, a head-mounted display (HMD) device and a teleport device. Examples of the computing device include, but are not limited to, a laptop, a desktop, a tablet, a phablet, a personal digital assistant, a workstation, and a console.

The term "head-mounted display" device refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like. The term "teleport device" refers to a specialized equipment that is capable of facilitating virtual teleportation.

It will be appreciated that the term "at least one server" refers to "a single server" in some implementations, and to "a plurality of servers" in other implementations. When the system comprises the single server, all operations of the system could be performed by the single server. When the system comprises the plurality of servers, different operations of the system could be performed by different (and specially configured) servers from amongst the plurality of servers. As an example, a first server from amongst the plurality of servers may be configured to utilise the 3D model for generating the reconstructed image, and a second server from amongst the plurality of servers may be configured to apply the extended depth-of-field (EDOF) correction to the at least one group of neighbouring pixels in the given image.

Throughout the present disclosure, the term "three-dimensional model" of the real-world environment refers to a data structure that comprises comprehensive information pertaining to a 3D space of the real-world environment. Such comprehensive information is indicative of at least one of: surfaces of objects or their parts present in the real-world environment, a plurality of features of the objects or their parts, shapes and sizes of the objects or their parts, poses of the objects or their parts, materials of the objects or their parts, colour information and depth information of the objects or their portions, light sources and lighting conditions within the real-world environment. The term "object" refers to a physical object or a part of the physical object present in the real-world environment. An object could be a living object (for example, such as a human, a pet, a plant, and the like) or a non-living object (for example, such as a wall, a window, a toy, a poster, a lamp, and the like). Examples of the plurality of features include, but are not limited to, edges, corners, blobs and ridges.

Optionally, the 3D model of the real-world environment is in a form of at least one of: a 3D polygonal mesh, a 3D point cloud, a 3D surface cloud, a voxel-based model, a parametric model, a 3D grid, a 3D hierarchical grid, a bounding volume hierarchy, an image-based 3D model. The 3D polygonal mesh could be a 3D triangular mesh or a 3D quadrilateral mesh.

In an embodiment, the at least one server is configured to obtain the 3D model of the real-world environment from a data repository communicably coupled to the at least one server. In such a case, the 3D model of the real-world environment is pre-generated (for example, by the at least one server), and pre-stored at the data repository. It will be appreciated that the data repository could, for example, be implemented as a memory of the at least one server, a memory of the device, a memory of the computing device, a removable memory, a cloud-based database, or similar. Optionally, the system further comprises the data repository.

In another embodiment, when obtaining the 3D model of the real-world environment, the at least one server is configured to generate the 3D model from a plurality of visible-light images and a plurality of depth maps (corresponding to the plurality of visible-light images), based on corresponding camera poses from which the plurality of visible-light images and the plurality of depth maps are captured. Optionally, the at least one server is configured to employ at least one data processing algorithm for processing the plurality of visible-light images to generate the 3D model. The at least one data processing algorithm could be at least one of: a feature extraction algorithm, an image stitching algorithm, an image merging algorithm, an interpolation algorithm, a 3D modelling algorithm, a photogrammetry algorithm, an image blending algorithm. Such data processing algorithms are well-known in the art. It will be appreciated that the plurality of visible-light images, the plurality of depth maps, and the information pertaining to the corresponding camera poses could be received by the at least one server from a device comprising pose-tracking means and at least one camera implemented as a combination of a visible-light and a depth camera, or from a data repository in which the plurality of visible-light images, the plurality of depth maps, and the information pertaining to the corresponding camera poses are pre-stored.

Throughout the present disclosure, the term "camera" refers to an equipment that is operable to detect and process light signals received from the real-world environment, so as to capture images of the real-world environment. Optionally, the given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the given camera is implemented as a depth camera. Examples of the depth camera include, but are limited to, a Time-of-Flight (ToF) camera, a light detection and ranging (LIDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. The given camera is optionally implemented as a combination of the visible-light camera and the depth camera. The given camera may have a sensor chip having some phase detection autofocus (PDAF) pixels. Optionally, the given camera (or the device comprising the given camera) is communicably coupled to the at least one server.

It will be appreciated that the given image is a visual representation of the real-world environment. The term "visual representation" encompasses colour information represented in the given image, and additionally optionally other attributes associated with the given image (for example, such as depth information, luminance information, transparency information, and the like).

Optionally, the at least one server is configured to receive the given image from any one of:
- the given camera,
- the device comprising the given camera,
- the data repository in which the given image and the pose information are pre-stored.

Furthermore, the term "pose" encompasses both a position and an orientation. Optionally, in this regard, pose-tracking means is employed to detect and/or follow a pose of the given camera from which the given image is captured. Optionally, the at least one server is configured to receive the pose information from any one of:
- a device comprising the pose-tracking means and the given camera,
- an external pose-tracking means,
- the data repository in which the pose information is pre-stored along with the given image.

The pose tracking means may employ an outside-in tracking technique, an inside-out tracking technique, or a combination of both the aforesaid tracking techniques, for collecting pose-tracking data. Such techniques are well-known in the art. The pose-tracking data may be in form of at least one of: images, Inertial Measurement Unit (IMU) values, Time-Inertial Measurement Unit (TIMU) values, motion sensor data values, magnetic field strength values. Optionally, a processor of the device is configured to: process the pose-tracking data to determine a given camera pose of the given camera from which the given image is captured; and send, to the at least one server, the pose information indicative of the given camera pose. Optionally, the processor of the device is configured to employ at least one data processing algorithm to process the pose-tracking data. Examples of the at least one data processing algorithm include a feature detection algorithm, an environment mapping algorithm, and a pose data extrapolation algorithm.

Notably, the reconstructed image is a visual representation of the real-world environment from the perspective of the given camera pose, said visual representation being generated using the 3D model. Optionally, when utilising the 3D model of the real-world environment to generate the reconstructed image, the at least one server is configured to employ at least one data processing algorithm. Optionally, in this regard, the at least one data processing algorithm enables in transforming a 3D point in the 3D model to a 2D point in the reconstructed image, from the perspective of the given camera pose. Optionally, the at least one data processing algorithm is at least one of: an image synthesis algorithm (such as an RGB-D image synthesis algorithm), a view synthesis algorithm, a rendering algorithm. Such data processing algorithms are well-known in the art. In an example, when the 3D model is in the form of a 3D polygonal mesh (for example, such as a 3D triangular mesh), the image synthesis algorithm may be a triangle rasterization algorithm. In another example, when the 3D model is in the form of a voxel-based model (such as a Truncated Signed Distance Field (TSDF) model), the image synthesis algorithm may be a ray-marching algorithm. In yet another example, when the 3D model is in the form of a 3D point cloud, the rendering algorithm may be a point cloud rendering algorithm, a point cloud splatting algorithm, an elliptical weighted-average surface splatting algorithm, or similar. Generating the reconstructed image using the 3D model is well-known in the art.

Throughout the present disclosure, the term "neighbouring pixels" refers to pixels that are located in close vicinity of each other. It will be appreciated that only out-of-focus group(s) of neighbouring pixels in the given image are to be identified (as discussed hereinbelow), and to be subsequently compared with the corresponding group of neighbouring pixels in the reconstructed image for determining the PSF, instead of comparing individual pixels in the given image with corresponding pixels in the reconstructed image for determining the PSF. This potentially saves processing resources and processing time of the at least one server.

Optionally, in the method, the step of identifying the at least one group of neighbouring pixels comprises:
- identifying at least one segment of the given image that is out of focus;
- dividing the at least one segment of the given image into a plurality of groups of neighbouring pixels, based on at least one of:
  - a gradient of optical depth across a given group of neighbouring pixels,
  - a difference in optical depth between the given group of neighbouring pixels and at least one adjacent group of neighbouring pixels that is adjacent to the given group; and
- selecting the at least one group of neighbouring pixels from amongst the plurality of groups of neighbouring pixels.

It will be appreciated that the given image may represent multiple objects throughout its field of view, wherein some of the multiple objects may be in-focus in the given image, while remaining of the multiple objects may be out-of-focus (namely, blurred) in the given image. In this regard, the at least one segment of the given image that is out of focus (namely, the at least one segment representing out-of-focus objects or their portions) can be identified, for example, by using contrast analysis, edge detection, Fourier analysis, or similar. The aforesaid analyses and various edge detection techniques are well-known in the art. Additionally or alternatively, the at least one segment of the given image that is out of focus can be identified using a depth map corresponding to the given image. This is because pixels of the given image whose optical depth values lie within a given focussing distance range of the given camera would be in-focus pixels of the given image, while remaining pixels of the given image whose optical depth values lie within different focussing distance range(s) would be out-of-focus pixels of the given image. It is to be understood that optical depth values of all pixels of the given image can be easily known from said depth map corresponding to the given image.

Subsequently, the at least one segment of the given image is divided into the plurality of groups of neighbouring pixels, based on the aforementioned criteria. Optionally, lesser the gradient of the optical depth across the given group of neighbouring pixels, lesser is the likelihood of any abrupt changes in optical depths throughout the given group, and vice versa. This is because when different parts of a same object are present at (almost) similar optical depths throughout the given group, i.e., optical depths of the different parts of the same object would lie within a predefined range from each other, and light reflecting from those parts of the object will have lesser interference with each other, across said given group. Optionally, the predefined range lies in a range of 10 centimetres to 50 centimetres; more optionally, in a range of 10 centimetres to 30 centimetres; yet more optionally, in a range of 10 centimetres to 20 centimetres. Herein, the term "gradient" refers to a difference in the optical depth of a given object or its portion across the given group of neighbouring pixels.

Additionally, optionally, greater the difference in the optical depth between the given group and the at least one adjacent group, greater is the likelihood that the given group and the at least one adjacent group represent different objects or different parts of a same object that are located at different optical depths from a perspective of the given camera that has captured the given image, and vice versa. In such a case, the different parts of the same object can also be considered as different objects. In an example, when a table comprising four legs is present in the real-world environment, the four legs of the table could be considered as different objects. Some legs (such as two front legs) of the table may appear in-focus in the given image, while remaining legs (such as two back legs) of the table may appear out-of-focus in the given image.

Consequently, the at least one group of neighbouring pixels is selected from the plurality of groups of neighbouring pixels for determining the PSF for the at least one group, and then said the at least one group is subsequently deblurred by applying the EDOF correction using said PSF. The aforesaid selection could be random, or based on a particular criterion (as discussed below). The term "segment" of the given image refers to a portion of the given image. It will be appreciated that the plurality of groups of neighbouring pixels may have different sizes and shapes.

Optionally, the at least one group of neighbouring pixels is selected from amongst the plurality of groups of neighbouring pixels, when the at least one group of neighbouring pixels overlaps with a region of interest in the given image. The term "region of interest" refers to a region (namely, a portion) of the given image whereat the user is focussing or is more likely to focus. In other words, the region of interest is a fixation region within the given image. The region of interest could have visual representation that is more noticeable and prominent as compared to visual representation in remaining region(s) of the given image. It will be appreciated that the user is more likely to focus on a region of the given image that represents, for example, such as a salient feature (namely, a visually alluring feature), a moving object, or a virtual object. For example, the user is more likely to focus on an edge, a corner, or a high-frequency texture detail as compared to interior features or low-frequency texture detail. The user is also more likely to focus on a central region in the given image.

When the at least one group of neighbouring pixels overlaps with the region of interest in the given image, it would be beneficial to deblur the at least one group of neighbouring pixels as compared to other groups of neighbouring pixels from amongst the plurality of groups of neighbouring pixels. Thus, the at least one server selectively applies the EDOF correction to the at least one group of neighbouring pixels in the given image, so that the at least one group of neighbouring pixels (representing objects in the region of interest) could be perceived by the user with a high visual acuity. Beneficially, the user experiences considerable realism upon viewing the given image upon said EDOF correction. In this manner, processing resources and processing time of the at least one server could also be minimized. This is because the EDOF correction is not applied to each group of neighbouring pixels in the plurality of groups of neighbouring pixels, but is only applied to the at least one group of neighbouring pixels overlapping with the region of interest.

Optionally, the method further comprises:
  obtaining information indicative of a gaze direction of a user; and
  determining the region of interest in the given image, based on the gaze direction of the user.

In this regard, the information indicative of the gaze direction of the user is received from a user device of the user, which comprises gaze-tracking means. The term "gaze-tracking means" refers to a specialized equipment for detecting and/or following gaze of the user. The term "gaze direction" refers to a direction in which the user is gazing. The gaze direction may be indicated by a gaze vector. The gaze-tracking means could be implemented as contact lenses with sensors, cameras monitoring a position, a size and/or a shape of a pupil of the user's eyes, and the like. Such gaze-tracking means are well-known in the art. It will be appreciated that the information indicative of the gaze direction of the user is received repeatedly from the gaze-tracking means, as user's gaze keeps changing. It will be appreciated that when the user's gaze is directed (namely, focused) towards a region within the given image, a gaze direction of a first eye and a gaze direction of a second eye of the user are different from each other, and both the aforesaid gaze directions typically converge at said region. Since the gaze direction of the user is known, the region of interest could be easily and accurately determined in the given image.

It will be appreciated that the region of interest need not necessarily be determined based on a gaze direction of a single user. In case of teleport devices, where multiple users are served at a same time, the region of interest could, for example, pertain to an object that is interacting with other objects in a given scene of the real-world environment, an object (such as a model of a machine) being showcased to the multiple users, and the like. As an example, the region of interest in the given image may be determined based on an average of gaze directions of the multiple users, when the given image is to be presented to the multiple users. As another example, the region of interest in the given image may be determined, based on information pertaining to a visual scene of the XR environment (for example, such as an XR educational conference).

As mentioned earlier, the neighbouring pixels of the at least one group are those pixels which are out of focus in the given image. Moreover, since the reconstructed image is generated using the 3D model, the reconstructed image has in-focus visual representation throughout its field of view. Thus, the neighbouring pixels in the corresponding group of the reconstructed image can be considered to be in-focus pixels, irrespective of whether the reconstructed image has a lower resolution, a similar resolution or a higher resolution as compared to the given image. This facilitates in accurately determining said correlation as defocused (namely, blurred) neighbouring pixels of the at least one group can be compared with focused neighbouring pixels of the corresponding group.

It is generally known that the PSF for the given camera varies with a distance of objects or their parts (present in the real-world environment) from the given camera. However, pursuant to embodiments of the present disclosure, it is sufficient to determine respective PSF for individual groups (namely, the at least one group) of neighbouring pixels, without a need to know optical depths of the neighbouring pixels in those individual groups. This is because the EDOF correction is applied to the individual groups of neighbouring pixels using the PSF that has been determined exclusively for those individual groups of neighbouring pixels.

As a result, the EDOF correction can be applied independent of the optical depths of the neighbouring pixels in those individual groups. Moreover, there is no need to determine the PSF by taking into account an entirety of the given image as only out-of-focus group(s) of neighbouring pixels in the given image are utilised for determining the PSF. This facilitates in saving processing resources and processing time of the at least one server.

Throughout the present disclosure, the term "point spread function" refers to responses of at least one optical element of the at least one camera to any one of: a point source, a point object. Ideally, the PSF is a two-dimensional (2D) diffraction pattern of light that is formed when an infinitely small point-like light source is imaged through the at least one optical element (for example, a lens system) of the at least one camera. A shape of the PSF is affected by optical properties of the at least one optical element, a distance between the infinitely small point-like light source and the at least one optical element, and a location of said light source within a field-of-view of the at least one camera. However, in practice, PSFs often appear like a Gaussian function, due to at least one of: diffraction of light, aberration of the at least one optical element, image sensing. The at least one optical element could be a lens of the at least one camera. The PSF is a measure for the quality of the at least one camera, as it reveals how at least one point is blurred in a given image captured by the at least one camera. The PSF allows for correction of out-of-focus blur in the given image, i.e., for deblurring the given image. If there is no out-of-focus blur, the given image does not require any deblurring and thus the PSF is centred about zero. The out-of-focus blur causes the PSF to move away from zero by an amount that is directly proportional to a shift in a pixel of the given image. Knowing the PSF is important for restoring sharpness of an (original) object with deconvolution in the given image. The PSF may be independent of a position in a plane of the object. The PSF of the at least one camera varies depending on a wavelength of light received by the at least one camera from the real-world environment. For example, a shorter wavelength of the light (for example, such as a blue light having a wavelength of 450 nanometres) result in a PSF that would be smaller than a PSF corresponding to a longer wavelength of the light (for example, such as a red light having a wavelength of 650 nanometres). The PSF may further depend on a numerical aperture (NA) of the lens (such as an objective lens) of the at least one camera. In an example, an objective lens having a higher NA may result in a smaller PSF as compared to an objective lens having a smaller NA. Moreover, the PSF may vary spatially across the lens. In other words, the PSF may vary across a field-of-view of the lens.

This may be due to manufacturing tolerances of the lens which deteriorate the PSF towards edges of the lens. For example, a PSF for a point along an optical axis of the lens can be (slightly) different from a PSF for a point that is towards a periphery of the field-of-view of the lens. Thus, it is difficult to design a lens which projects a point to an image plane when moving from a centre of the lens towards an edge of the lens.

The correlation between the at least one group of neighbouring pixels in the given image and the corresponding group of neighbouring pixels in the reconstructed image refers to a mathematical relation between pixel values of the neighbouring pixels in the at least one group and pixel values of the neighbouring pixels in the corresponding group. The aforesaid correlation could be determined by the at least one server using at least one: a mathematical formula, a mathematical function, a mapping between a given neighbouring pixel of the at least one group and a neighbouring pixel of the corresponding group. Techniques for determining a correlation between pixels of different images are well-known in the art. One example of such a technique has been described hereinbelow. A person skilled in the art will recognize many variations, alternatives, and modifications of techniques for determining the PSF.

It will be appreciated that the determination of the PSF (namely, based on the aforesaid correlation) can be represented mathematically as follows:

In the Fourier domain:

blurred_pixels_FT=ideal_pixels_FT*PSF_FT (Multiplication)

wherein, * (a single asterisk) represents multiplication.

In other words, a Fourier transform of the blurred pixels is equal to a multiplication of a Fourier transform of the ideal pixels and a Fourier transform of the PSF.

Therefore, PSF_FT=blurred_pixels_FT/ideal_pixels_FT

PSF=inverseFT (blurred_pixels_FT/ideal_pixels_FT)

Thus, the PSF can be determined by applying an inverse Fourier transform to a division of the Fourier transform of the blurred pixels and the Fourier transform of the ideal pixels. Hereinabove, the term "blurred pixels" refers to the neighbouring pixels of the at least one group in the given image that are out of focus, while the term "ideal pixels" refers to the neighbouring pixels of the corresponding group in the reconstructed image that are in focus. It will be appreciated that the PSF determined in this manner is acceptably accurate and reliable, and is easily determined without a need to know the optical depths.

It will be appreciated that the term "pixel value" of a given pixel encompasses colour value represented by the given pixel, and additionally optionally, at least one other attribute associated with the given pixel (for example, such as depth value, brightness value, transparency value, luminance value, and the like). As an example, the colour value could be an RGB value, an RGB-A value, an RGB-D value, an RGBW value, an RYYB value, an RGGB value, an RCCB values, an RGB-IR value, a Cyan-Magenta-Yellow-Black (CMYK) value, a Luminance and two-colour differences (YUV) value, or similar.

Furthermore, the term "extended depth-of-field correction" refers to a corrective image processing operation that emulates a visual effect of extension of the depth-of-field over which the objects or their parts in the real-world environment appear to be in-focus (i.e., well focused) in a given image. Herein, the term "depth-of-field" refers to a distance between a nearest point and a farthest point in the real-world environment that are acceptably sharply focused in the given image captured by the given camera. The nearest point lies in front of a focus point (for example, such as an object) on which a lens of the given camera is actually focused, while the farthest point lies behind the focus point. The nearest point and the farthest point may be at an equal distance or at an unequal distance from the focus point. The depth-of-field may be determined based on at least one of: a focal length of the lens of the given camera, a distance between the object and the given camera, a pixel size, an aperture size, a transmission characteristic of an aperture, a number of apertures (i.e., in case of the given camera having multiple apertures). The extension of the depth-of-field does not sacrifice resolution or brightness, thereby clearly capturing the objects in the real-world environment without a need to adjust the focus of the given camera and an angle between the objects and the given camera. The EDOF correction enables deblurring of objects that lie outside of a focal region of the lens of the given camera (i.e., outside the depth-of-field of the lens of the given camera) to produce an extended-in-focus view of the real-world environment. The EDOF correction may be applied to generate in-focus images of at least one of: multiple objects present in at least a foreground and/or a background of a given object in the real-world environment, oblique objects, objects at different heights, objects at different depths.

When the EDOF correction is applied to the at least one group of neighbouring pixels in the given image, pixel values of the at least one group of neighbouring pixels are corrected accordingly, by using the PSF determined for the at least one group of neighbouring pixels. Beneficially, upon applying the EDOF correction, the at least one group of neighbouring pixels in the given image appears realistic and highly accurate as objects represented in the at least one group appear acceptably sharp (i.e., well focused and clearly visible). Thus, upon the EDOF correction, an immersive and realistic viewing experience could be provided to a user viewing the given image.

It will be appreciated that the step of applying the EDOF correction to the at least one group of neighbouring pixels in the given image could be performed by using a neural network (for example, as discussed hereinbelow) which takes into account the PSF determined for the at least one group of neighbouring pixels. Thus, in such a case, said PSF is not used directly by the at least one server for the aforesaid EDOF correction, but is used by said neural network.

It will also be appreciated that the EDOF correction could also be applied by utilising at least one of: a defocus map estimation technique, a blind image deblurring deconvolution technique, a non-blind image deblurring deconvolution technique. Such techniques are well-known in the art. The EDOF correction may be performed by employing a deblurring neural network implemented using deep learning techniques, in order to correct (i.e., deblur) the at least one group of neighbouring pixels, outside a focal region of a lens of the given camera. One such deblurring neural network using deep learning techniques is described, for example, in "*EDOF-ToF: extended depth of field time-of-flight imaging*" by Jasper Tan, Vivek Boominathan et al., published in Optics Express, Vol. 29, Issue 23, pp. 38540-38556, November 2021, which has been incorporated herein by reference.

Optionally, the extended depth-of-field correction is applied by employing a Wiener filter to deconvolve the at least one group of neighbouring pixels in the given image with the point spread function determined for the at least one group of neighbouring pixels. In this regard, the Wiener filter can be used for deconvolution effectively when a frequency characteristic of the at least one group of neighbouring pixels and/or an additive noise in the at least one group of neighbouring pixels are at least partially known. When the additive noise is absent in the at least one group of neighbouring pixels, the Wiener filter is reduced to an ideal inverse filter. The aforesaid deconvolution process could be customised based on input provided by the user device associated with the user. Based on such input, at least one of: a noise-to-signal power value, an auto-correlation function, could be used to refine deblurring of the at least one group of neighbouring pixels in the given image. Employing the Wiener filter for deblurring images is well-known in the art.

Optionally, the method further comprises:
  convolving the corresponding group of neighbouring pixels in the reconstructed image according to the point spread function determined for the at least one group of neighbouring pixels;
  comparing pixels of the at least one group with respective pixels of the convolved corresponding group to detect whether any changes have occurred in a region of the real-world environment that is represented in the at least one group of neighbouring pixels; and
  applying the extended depth-of-field correction to the at least one group of neighbouring pixels in the given image, only when it is detected that no changes have occurred in said region of the real-world environment.

In this regard, when the corresponding group of neighbouring pixels in the reconstructed image is convolved, a quality of the corresponding group of neighbouring pixels in the reconstructed image is deliberately lowered (namely, degraded) to make it consistent with a quality of the neighbouring pixels of the at least one group in a manner that the neighbouring pixels of the convolved corresponding group can be appropriately compared with (respective) neighbouring pixels of the at least one group. In other words, upon convolving, the convolved corresponding group would be similar to the at least one group, and thus it is comparable with the at least one group for performing the aforesaid comparison of pixels.

It will be appreciated that convolving the reconstructed image according to the PSF determined for the at least one group can be represented mathematically as follows:

$$\text{blurred\_pixels} = \text{ideal\_pixels} ** \text{PSF (Convolution)}$$

wherein, ** (double asterisks) represents convolution.

In other words, blurred pixels are generated due to convolving of ideal pixels with the PSF determined for the at least one group of neighbouring pixels. Hereinabove, the term "blurred pixels" refers to a convolved version of the corresponding group of neighbouring pixels in the reconstructed image (i.e., the convolved corresponding group), whereas the term "ideal pixels" refers to neighbouring pixels of the corresponding group of the reconstructed image (namely, corresponding to the at least one group of neighbouring pixels of the given image).

It will be appreciated that any change in the region of the real-world environment may indicate a presence of a dynamic object in the real-world environment. It is to be understood that the dynamic object is an object present in the real-world environment whose properties (such as a pose, a shape, a size, and the like) change with respect to time. Examples of the dynamic object include, but are not limited to, a human, an animal, a robot, a moving car, a flying aeroplane.

Therefore, when pixel values of the neighbouring pixels of the at least one group and pixel values of the respective pixels of the convolved corresponding group are not considerably different (i.e., lie within a predefined colour threshold), it is detected that no (significant) changes have occurred in the region of the real-world environment. Therefore, the EDOF correction is applied to the at least one group of neighbouring pixels in the given image. Conversely, when pixel values of the pixels of the at least one group and pixel values of the respective pixels of the convolved corresponding group are considerably different (i.e., lie outside the predefined colour threshold), it is detected that some (significant) changes have occurred in the region of the real-world environment, for example, due to the presence of the dynamic object. Therefore, the EDOF correction is not applied to the at least one group of neighbouring pixels in the given image as accurate and up-to-date pixel values pertaining to the dynamic object are not available in the 3D model. In this manner, the processing resources and the processing time of the at least one server could be saved as the at least one server selectively applies the EDOF correction to the at least one group of neighbouring pixels in the given image.

Optionally, when the pixel value is a colour value, the predefined colour threshold lies in a range of −20 percent to +20 percent of a dynamic range of colour values in the given image. More optionally, the predefined colour threshold lies in a range of −10 percent to +10 percent, or yet more optionally, in a range of −5 percent to +5 percent of the dynamic range of colour values in the given image. As an example, when a colour value of a pixel of the at least one group is 350 (i.e., when an RGB value is 50, 100, 200), and a colour value of a respective pixel of the convolved corresponding group is 363 (i.e., when an RGB value is 48, 95, 220), the colour value of the pixel and the colour value of the respective pixel would be considered to lie within the predefined colour threshold.

The present disclosure also relates to the system and to the computer program product as described above. Various embodiments and variants disclosed above, with respect to the first aspect, apply mutatis mutandis to the system and to the computer program product.

Optionally, when identifying the at least one group of neighbouring pixels, the at least one server is configured to:
identify at least one segment of the given image that is out of focus;
divide the at least one segment of the given image into a plurality of groups of neighbouring pixels, based on at least one of:
a gradient of optical depth across a given group of neighbouring pixels,
a difference in optical depth between the given group of neighbouring pixels and at least one adjacent group of neighbouring pixels that is adjacent to the given group; and
select the at least one group of neighbouring pixels from amongst the plurality of groups of neighbouring pixels.

Optionally, the at least one server is configured to select the at least one group of neighbouring pixels from amongst the plurality of groups of neighbouring pixels, when the at least one group of neighbouring pixels overlaps with a region of interest in the given image.

Optionally, the at least one server is further configured to:
obtain information indicative of a gaze direction of a user; and
determine the region of interest in the given image, based on the gaze direction of the user.

Optionally, the at least one server is configured to apply the extended depth-of-field correction by employing a Weiner filter to deconvolve the at least one group of neighbouring pixels in the given image with the point spread function determined for the at least one group of neighbouring pixels.

Optionally, the at least one server is further configured to:
convolve the corresponding group of neighbouring pixels in the reconstructed image according to the point spread function determined for the at least one group of neighbouring pixels;
compare pixels of the at least one group with respective pixels of the convolved corresponding group to detect whether any changes have occurred in a region of the real-world environment that is represented in the at least one group of neighbouring pixels; and
apply the extended depth-of-field correction to the at least one group of neighbouring pixels in the given image, only when it is detected that no changes have occurred in said region of the real-world environment.

DETAILED DESCRIPTION OF THE DRAWINGS

Referring to FIG. 1, illustrated is a block diagram of a system 100 for incorporating extended depth-of-field correction using reconstructed image, in accordance with an embodiment of the present disclosure. The system 100 comprises at least one server (depicted as a server 102) and, optionally, a data repository 104 communicably coupled to the server 102. Optionally, the server 102 is communicably coupled to a camera 106 or to a device comprising the camera 106.

It may be understood by a person skilled in the art that FIG. 1 includes a simplified architecture of the system 100, for sake of clarity, which should not unduly limit the scope of the claims herein. It is to be understood that the specific implementation of the system 100 is provided as an example and is not to be construed as limiting it to specific numbers or types of servers, data repositories, and cameras. The person skilled in the art will recognize many variations, alternatives, and modifications of embodiments of the present disclosure.

Figure 2:
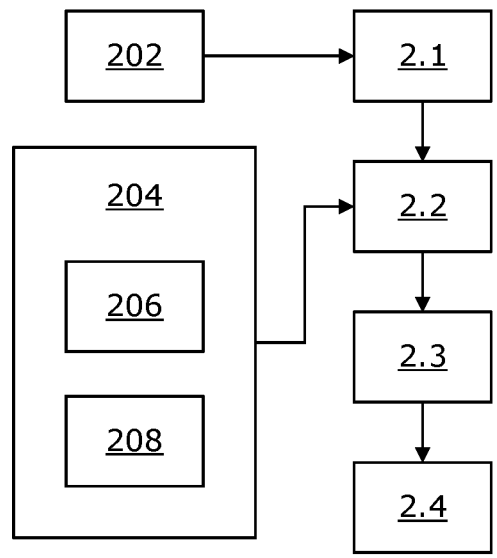
FIG. 2 illustrates an exemplary process flow for applying an extended depth-of-field correction on an image, in accordance with an embodiment of the present disclosure.

Referring to FIG. 2, illustrated is an exemplary process flow for applying an extended depth-of-field correction on an image, in accordance with an embodiment of the present disclosure. At step 2.1, a three-dimensional (3D) model of a real-world environment is generated by at least one server from a plurality of visible-light images and a plurality of depth maps (corresponding to the plurality of visible-light images), based on corresponding camera poses from which the plurality of visible-light images and the plurality of depth maps are captured, the plurality of visible-light images, the plurality of depth maps, and information pertaining to the corresponding camera poses being received from a device 202 comprising a visible-light camera, a depth camera, and pose-tracking means. At step 2.2, an image of the real-world environment and pose information indicative of a camera pose from which the image is captured, are received from a device 204 comprising pose-tracking means 206 and a camera 208. At step 2.3, the 3D model of the real-world environment is utilised to generate a reconstructed image from a perspective of the camera pose. At step 2.4, an extended depth-of-field correction is applied to group(s) of neighbouring pixels in the given image that is/are out of focus, by using a point spread function that is determined based on a correlation between the group(s) of neighbouring pixels and a corresponding group of neighbouring pixels in the reconstructed image.

Figure 3:
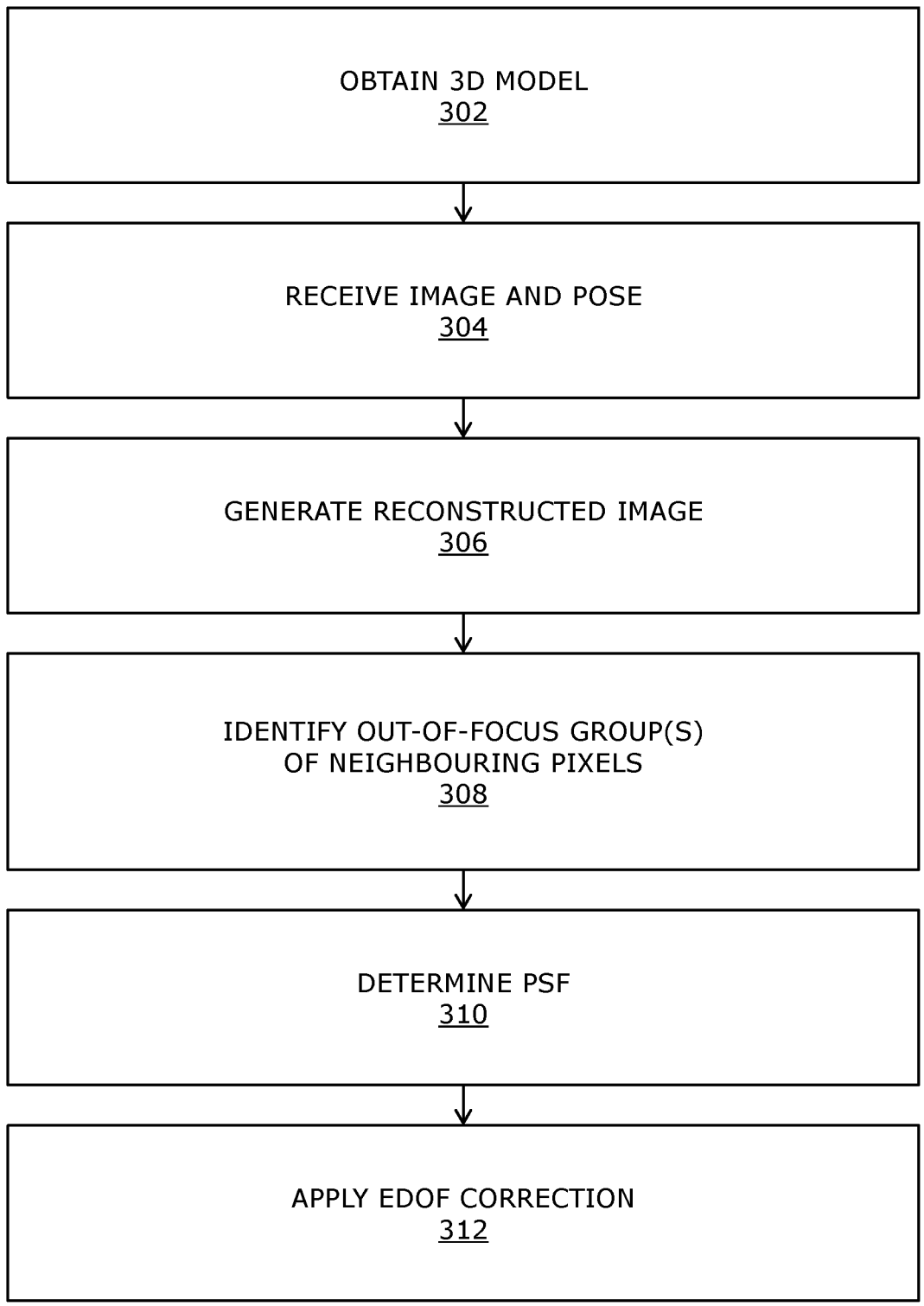
FIG. 3 illustrates steps of a computer-implemented method for incorporating extended depth-of-field correction using reconstructed image, in accordance with an embodiment of the present disclosure.

Referring to FIG. 3, illustrated are steps of a computer-implemented method for incorporating extended depth-of-field correction using reconstructed image, in accordance with an embodiment of the present disclosure. At step 302, a three-dimensional (3D) model of a real-world environment is obtained. At step 304, a given image of the real-world environment captured using a given camera, and pose information indicative of a given camera pose from which the given image is captured, are received. At step 306, the 3D model of the real-world environment is utilised to generate a reconstructed image from a perspective of the given camera pose. At step 308, at least one group of neighbouring pixels in the given image that is out of focus is identified. At step 310, a point spread function for the at least one group of neighbouring pixels in the given image is determined, based on a correlation between the at least one group of neighbouring pixels and a corresponding group of neighbouring pixels in the reconstructed image. At step 312, an extended depth-of-field correction is applied to the at least one group of neighbouring pixels in the given image, by using the point spread function determined for the at least one group of neighbouring pixels.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer-implemented method comprising:
   obtaining a three-dimensional (3D) model of a real-world environment;
   receiving a given image of the real-world environment captured using a given camera, and pose information indicative of a given camera pose from which the given image is captured;
   utilising the 3D model of the real-world environment to generate a reconstructed image from a perspective of the given camera pose;
   identifying at least one group of neighbouring pixels in the given image that is out of focus;
   determining a point spread function for the at least one group of neighbouring pixels in the given image, based on a correlation between the at least one group of neighbouring pixels and a corresponding group of neighbouring pixels in the reconstructed image; and
   applying an extended depth-of-field correction to the at least one group of neighbouring pixels in the given image, by using the point spread function determined for the at least one group of neighbouring pixels;
   wherein the step of identifying the at least one group of neighbouring pixels comprises:
      identifying at least one segment of the given image that is out of focus;
      dividing the at least one segment of the given image into a plurality of groups of neighbouring pixels, based on at least one of:
         a gradient of optical depth across a given group of neighbouring pixels,
         a difference in optical depth between the given group of neighbouring pixels and at least one adjacent group of neighbouring pixels that is adjacent to the given group; and
      selecting the at least one group of neighbouring pixels from amongst the plurality of groups of neighbouring pixels.

2. The computer-implemented method of claim 1, wherein the at least one group of neighbouring pixels is selected from amongst the plurality of groups of neighbouring pixels, when the at least one group of neighbouring pixels overlaps with a region of interest in the given image.

3. The computer-implemented method of claim 2, further comprising:
   obtaining information indicative of a gaze direction of a user; and
   determining the region of interest in the given image, based on the gaze direction of the user.

4. The computer-implemented method of claim 1, wherein the extended depth-of-field correction is applied by employing a Weiner filter to deconvolve the at least one group of neighbouring pixels in the given image with the point spread function determined for the at least one group of neighbouring pixels.

5. The computer-implemented method of claim 1, further comprising:
   convolving the corresponding group of neighbouring pixels in the reconstructed image according to the point spread function determined for the at least one group of neighbouring pixels;
   comparing pixels of the at least one group with respective pixels of the convolved corresponding group to detect whether any changes have occurred in a region of the real-world environment that is represented in the at least one group of neighbouring pixels; and
   applying the extended depth-of-field correction to the at least one group of neighbouring pixels in the given image, only when it is detected that no changes have occurred in said region of the real-world environment.

6. A computer program product comprising a non-transitory machine-readable data storage medium having stored thereon program instructions that, when executed by a processor, cause the processor to execute steps of a computer-implemented method of claim 1.

7. A system comprising at least one server configured to:
   obtain a three-dimensional (3D) model of a real-world environment;
   receive a given image of the real-world environment captured using a given camera, and pose information indicative of a given camera pose from which the given image is captured;
   utilise the 3D model of the real-world environment to generate a reconstructed image from a perspective of the given camera pose;
   identify at least one group of neighbouring pixels in the given image that is out of focus;
   determine a point spread function for the at least one group of neighbouring pixels in the given image, based on a correlation between the at least one group of neighbouring pixels and a corresponding group of neighbouring pixels in the reconstructed image;
   apply an extended depth-of-field correction to the at least one group of neighbouring pixels in the given image, by using the point spread function determined for the at least one group of neighbouring pixels; and
   when identifying the at least one group of neighbouring pixels, the at least one server is configured to:
      identify at least one segment of the given image that is out of focus;
      divide the at least one segment of the given image into a plurality of groups of neighbouring pixels, based on at least one of:
         a gradient of optical depth across a given group of neighbouring pixels, a difference in optical depth between the given group of neighbouring pixels and at least one adjacent group of neighbouring pixels that is adjacent to the given group; and select the at least one group of neighbouring pixels from amongst the plurality of groups of neighbouring pixels.

8. The system of claim 7, wherein the at least one server is configured to select the at least one group of neighbouring pixels from amongst the plurality of groups of neighbouring pixels, when the at least one group of neighbouring pixels overlaps with a region of interest in the given image.

9. The system of claim 8, wherein the at least one server is further configured to:

obtain information indicative of a gaze direction of a user; and determine the region of interest in the given image, based on the gaze direction of the user.

10. The system of claim 7, wherein the at least one server is configured to apply the extended depth-of-field correction by employing a Weiner filter to deconvolve the at least one group of neighbouring pixels in the given image with the point spread function determined for the at least one group of neighbouring pixels.

11. The system of claim 7, wherein the at least one server is further configured to:

convolve the corresponding group of neighbouring pixels in the reconstructed image according to the point spread function determined for the at least one group of neighbouring pixels;

compare pixels of the at least one group with respective pixels of the convolved corresponding group to detect whether any changes have occurred in a region of the real-world environment that is represented in the at least one group of neighbouring pixels; and apply the extended depth-of-field correction to the at least one group of neighbouring pixels in the given image, only when it is detected that no changes have occurred in said region of the real-world environment.

\* \* \* \* \*